(12) United States Patent
Mcbride et al.

(10) Patent No.: US 6,444,106 B1
(45) Date of Patent: Sep. 3, 2002

(54) METHOD OF MOVING FLUID IN A MICROFLUIDIC DEVICE

(75) Inventors: Sterling Eduard Mcbride, Lawrenceville; Satyam Choudary Cherukuri, Cranbury, both of NJ (US); Pamela Kay York, Yardley, PA (US)

(73) Assignee: Orchid BioSciences, Inc., Princeton, NJ (US)

( * ) Notice: Subject to any disclaimer, the term of this patent is extended or adjusted under 35 U.S.C. 154(b) by 0 days.

(21) Appl. No.: 09/350,762

(22) Filed: Jul. 9, 1999

(51) Int. Cl.⁷ .............................................. G01N 27/26
(52) U.S. Cl. ....................... 204/450; 204/451
(58) Field of Search ................. 204/409, 450, 204/451, 600, 601

(56) References Cited

U.S. PATENT DOCUMENTS

| | | |
|---|---|---|
| 4,752,788 A | 6/1988 | Yasuhara et al. |
| 5,082,627 A | 1/1992 | Stanbro |
| 5,171,132 A | 12/1992 | Miyazaki et al. |
| 5,178,190 A | 1/1993 | Mettner |
| 5,283,037 A | 2/1994 | Baer et al. |
| 5,529,465 A | 6/1996 | Zengerle |
| 5,630,925 A | 5/1997 | Pentoney, Jr. et al. |
| 5,700,360 A | 12/1997 | Chan et al. |
| 5,755,942 A | 5/1998 | Zanzucchi et al. |
| 5,759,014 A | 6/1998 | Van Lintel |
| 5,785,831 A | 7/1998 | Bek |
| 5,824,204 A | 10/1998 | Jerman |
| 5,833,826 A | 11/1998 | Nordman |
| 5,846,396 A | 12/1998 | Zanzucchi et al. |
| 6,106,685 A * | 8/2000 | McBride et al. ............ 204/600 |

* cited by examiner

Primary Examiner—Jill Warden
Assistant Examiner—Alex Noguerola
(74) Attorney, Agent, or Firm—Kevin G. Mierzwa

(57) ABSTRACT

A microfluidic device has a layer that has a capillary break formed by a capillary sluice. The capillary sluice has a lower surface and an upper surface. An input channel is coupled to the capillary break. A first electrode is disposed proximate the lower surface. The first electrode is coupled to the voltage source. A second electrode is spaced a first predetermined distance from the first electrode coupled to the voltage source. A third electrode is spaced apart from the second electrode and positioned within the input channel from the first electrode coupled to the voltage source.

2 Claims, 5 Drawing Sheets

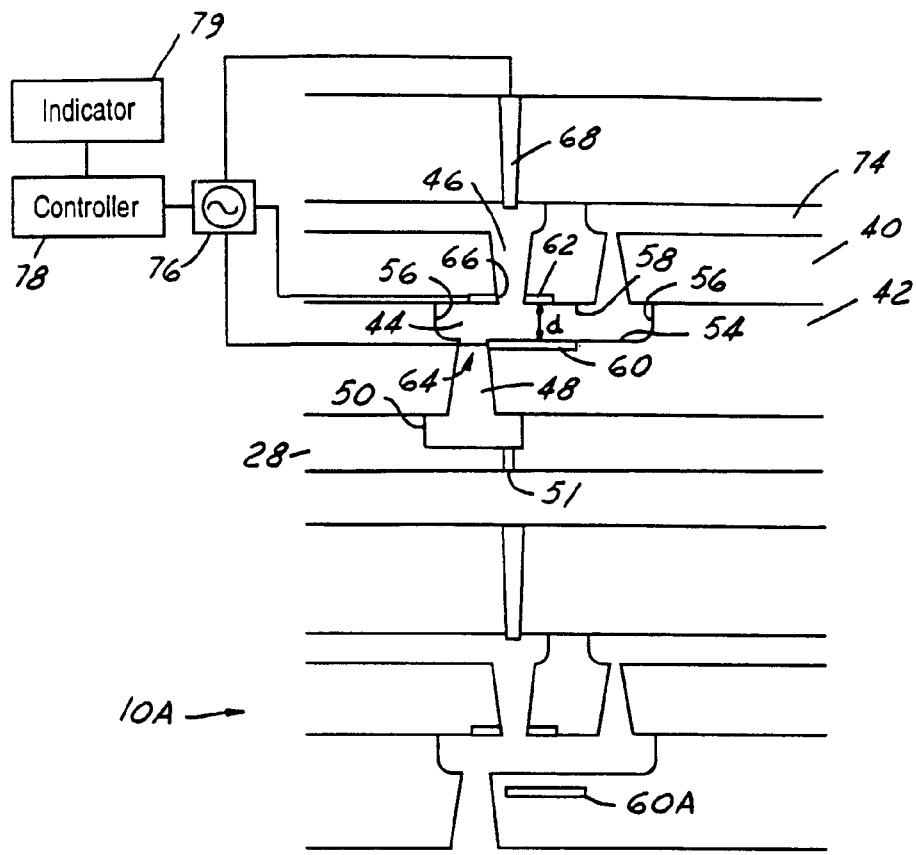
FIG. 3
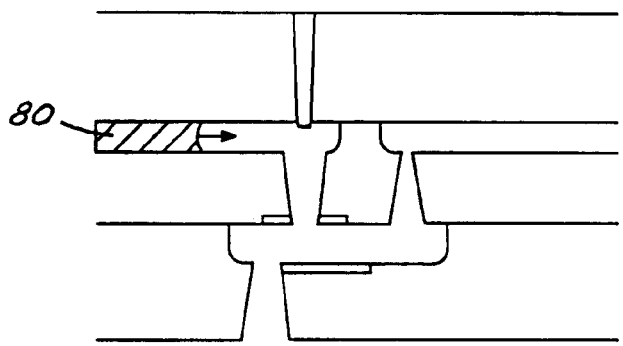
FIG. 4
FIG. 5
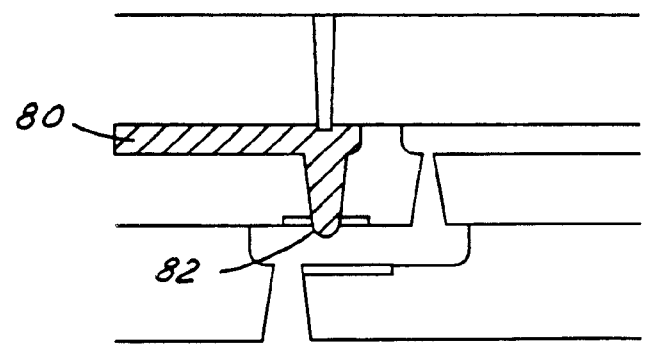
FIG. 6

METHOD OF MOVING FLUID IN A MICROFLUIDIC DEVICE

TECHNICAL FIELD

The present invention relates to microfluidic devices, and more particularly, to a method of moving fluid within or out of a microfluidic device.

BACKGROUND OF THE INVENTION

Methods of making a homologous series of compounds, or the testing of new potential drug compounds comprising a series of light compounds, has been a slow process because each member of a series or each potential drug must be made individually and tested individually. For example, a plurality of potential drug compounds that differ perhaps only by a single amino acid or nucleotide base, or a different sequence of amino acids or nucleotides are tested by an agent to determine their potential for being suitable drug candidates.

The processes described above have been improved by microfluidic chips, which are able to separate materials in a micro channel and move the materials through the micro channel. Moving the materials through micro channels is possible by use of various electro-kinetic processes such as electrophoresis or electro-osmosis. Fluids may be propelled through various small channels by the electro-osmotic forces. An electro-osmotic force is built up in the channel via surface charge buildup and by means of an external electric field that can repel fluid and cause flow.

In fluid delivery in microfluidic structures, several layers comprise the device. Channels often extend between the various layers. A capillary break structure is used in place of a valve downstream of an electrohydrodynamic pump in a channel. The capillary break is a location where the small channel ends abruptly as the entrance to a larger space. Capillary forces pull the fluid up to the end of the small cross-section channel but not beyond. This stops the fluid flow until additional pressure is provided. Prior to pushing fluid beyond the capillary break, a gap or discontinuity occurs in the fluid path immediately downstream of the capillary break. This prevents cross-contamination from other fluid paths.

In some instances, an electrohydrodynamic pump generates a relatively low pressure and may not be able to overcome the capillary break without an additional pressure applied. Also, size, uniformity, and other fabrication tolerances cause variances in the effectiveness of electrohydrodynamic pumps. Also, the microfluidic chip is preferably designed to be used with several different types of fluid. The variation of fluid properties, such as composition and temperature, also affect the ability of an electrohydrodynamic pump to overcome the capillary break.

It would, therefore, be desirable to enable a capillary break to be overcome for various fabrication tolerances and fluids used within the microfluidic device. It would also be desirable to sense the proper operation of a capillary break.

SUMMARY OF THE INVENTION

It is, therefore, one object of the invention to provide an improved fluid delivery mechanism to an array of reaction wells.

It is a further object of the invention to reliably overcome a capillary break in spite of manufacturing tolerances.

In one aspect of the invention, a microfluidic device has a layer that has a capillary break formed by a capillary sluice. The capillary sluice has a lower surface and an upper surface. An input channel is coupled to the capillary break. A first electrode is disposed proximate the lower surface. The first electrode is coupled to the voltage source. A second electrode is spaced a first predetermined distance from the first electrode coupled to the voltage source. A third electrode is spaced apart from the second electrode and positioned within the input channel from the first electrode coupled to the voltage source.

One advantage of the invention is that the controller and the software therein may be adjusted to control the operation of the microfluidic device.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 3 is cross sectional view of an apparatus according to the present invention.

FIG. 4 is a partial cross sectional view of an alternative embodiment of an apparatus according to the present invention.

FIG. 5 is a cross-sectional view of a microfluidic device when fluid is first introduced thereto.

FIG. 6 is a cross-sectional view of a microfluidic device having fluid up to a capillary break therein.

DETAILED DESCRIPTION OF THE PREFERRED EMBODIMENT

Figure 1:
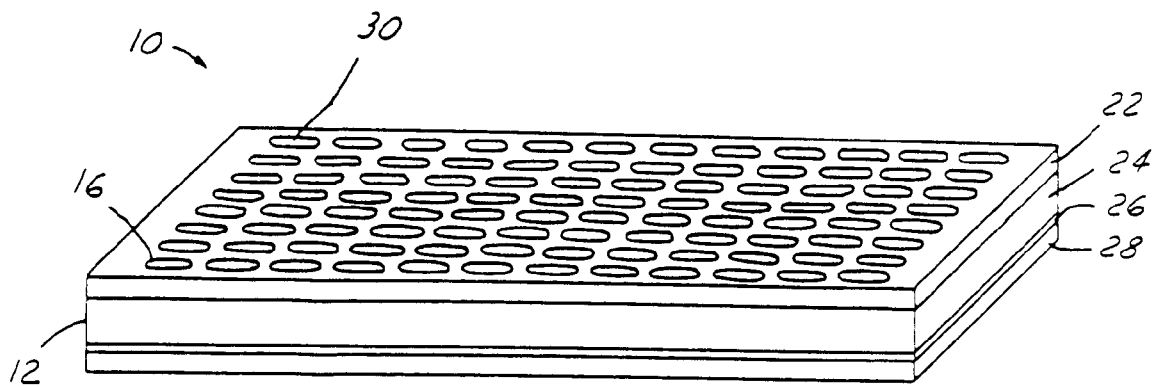
FIG. 1 is a schematic view of a fluid distribution system network formed according to the present invention.
Figure 2:
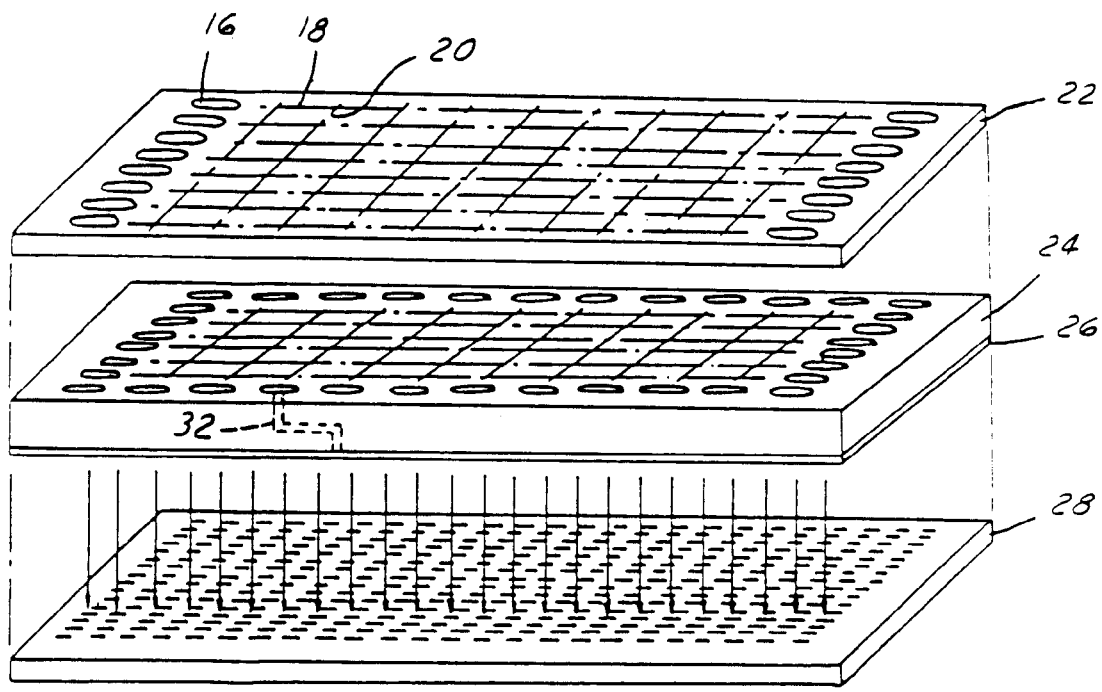
FIG. 2 is a cross-sectional view along line 2—2 of FIG. 1.

Referring to FIGS. 1 and 2, a microfluidic distribution system 10 is shown incorporated into a microfluidic device 12.

Fluid distribution system 10 has fluid inputs 16 coupled to a fluid source (not shown). Fluid inputs 16 are coupled to a main channel 18. Main channel 18 has a plurality of branches 20 extending therefrom. Main channel 18 is coupled to a fluid source (not shown) that directs the fluid outside of microfluidic device 12 that has not been diverted by one of the plurality of branches 20.

The fluid source is preferably a pressurized fluid source that provides pressurized fluid to main channel 18. Various types of pressurized fluid sources would be evident to those skilled in the art.

Microfluidic device 12 is preferably comprised of a plurality of adjacent layers. In the present example, a top layer 22, a second layer 24, a seal layer 26 and a well layer 28 are used. The composition of each layer may, for example, be glass, silicon, or another suitable material known to those in the art. Each layer may be bonded or adhesively joined together in a manner known to those skilled in the art. For example, the layers may be anodically bonded.

Second layer 24 is illustrated as single layer. However, second layer 24 may be comprised of several layers interconnected through fluid channels. Although only one seal layer 26 is shown for simplicity, one skilled in the art would recognize that a seal layer may be used between any of the layers.

Branches 20 provide interconnections to well layer 28 through the various layers 22–28. The various openings and channels forming branches 20 may be formed in a conventional manner, such as by etching or drilling. Drilling may be accomplished by laser drilling.

Main channel 18 in the preferred embodiment is by first layer 22 and second layer 24. A cell feed 30 is formed between top layer 22 and within second layer 24. Cell feed 30 is coupled to main channel 18 through interlayer feed channel 32. Interlayer feed channel 32, as illustrated, is conical in shape. However, interlayer feed channel 32 may also be cylindrical in shape.

Referring now to FIG. 3, a cross-sectional view of a first embodiment of the present invention is illustrated. A portion of microfluidic device 10 is shown. In this example, second layer 24 is comprised of two layers 40 and 42 each of which is preferably a dielectric material. Well layer 28 and seal layer 26 are not shown for simplicity, although a constructed device would likely include such layers.

A sluice 44 is defined by layers 40, 42. Sluice 44 receives fluid from an input capillary channel 46. Fluid is removed from sluice 44 through an output capillary channel 48. Output capillary channel 48 may provide fluid to a well 50 within well layer 28. Well 50 may have an exit or drain 51. A capillary break 52 is formed at the interface between layers 40 and 42. That is, as fluid within capillary channel 46 reaches the larger space of sluice 44, additional forces must be provided that are greater than the capillary forces within the fluid in input capillary channel 46.

Layer 42 defines a portion of sluice 44. That is, layer 42 defines bottom surface 54 and side surfaces 56 of sluice 44. Layer 40 defines an upper surface 58 of sluice 44.

A first electrode 60 is disposed upon bottom surface 54. First electrode may be a plate or a point electrode as will be further desribed below. Spaced apart from first electrode 60, a second electrode 62 is spaced apart therefrom. Second electrode 62 is disposed upon upper surface 58. As will be further described below, the position of second electrode 62 is preferably upstream from first electrode 60. Although not shown, first electrode 60 may encircle an exit opening 64. Likewise, second electrode 62 may encircle an entrance opening 66 to sluice 44. First electrode 60 and second electrode 62 are preferably formed of an electrically conductive material such as platinum, gold, silicon. First electrode 60 and second electrode 62 are separated by a distance.

A third electrode 68 is positioned within input capillary channel 46. Third electrode may also be a plate or a point electrode as will be further described below. Input capillary channel has a first portion 70 and a second portion 72.

A reset channel 74 is fluidically coupled to, sluice 44. Reset channel 74, as will be further described and illustrated below, is coupled to a gas or air source that is used to flush fluid from within sluice 44. Once the capillary break is overcome fluid will flow until it is reset by flushing fluid from sluice 44.

First electrode 60 and second electrode 62 are exposed within sluice 44. That is, first electrode 60 and second electrode 62 contact the fluid within sluice 44. First electrode 60, second electrode 62 and third electrode 68 also may also be partially or fully imbedded within respective layers 40, 42 or coated with a dielectric material as will further be described below.

A voltage source 76 is electrically coupled to first electrode 60, second electrode 62 and third electrode 68. Voltage source 76 is preferably a direct current source. However, an alternating current voltage source may also be used. The magnitude of the voltage supplied by voltage source 76 should be sufficient enough to provide a potential difference between relevant electrodes to overcome capillary break 52.

First electrode 60, second electrode 62 and third electrode 68 may also be coupled to a controller 79. Controller 78 is used to control the operation of microfluidic device 10 by controlling the application of voltage to the electrodes 60, 62 and 68. Controller 78 may, for example, be microprocessor based. In that case, controller 78 may also be used to sense the electrical characteristic of current between first electrode 60 and second electrode 62 since each of the electrodes contacts fluid.

An indicator 79 is coupled to controller 78. Indicator 79 may be used to provide an operator of microfluidic device 10 that the capillary break 52 is operating properly. Indicator 79 may, for example, be a light emitting diode (LED), a screen indicator or an audible indicator such as a warning bell. A screen indicator may indicate on a computer screen that a fault has occurred and the location of the fault for diagnostic purposes.

Referring now to FIG. 4, a second embodiment of a microfluidic device 10A is illustrated. Common elements from FIG. 3 have been given the identical reference numeral in FIG. 4. In this embodiment, first electrode 60A is embedded into layer 42. Alternatively, first electrode 60 may be coated with a dielectric material. Either way, electrode 60A is electrically separated from fluids in sluice 44. Providing a separation between electrode 60A will prevent electrode 60 from participating in a electrochemical reaction or acting directly electrically with the fluids in microfluidic device 10A.

Referring now to FIG. 5, cross-sectional view of a first step in moving fluid in microfluidic chip 10 is illustrated. Fluid 80 enters input capillary channel 46 under fluidic pressure from a fluid source and/or through capillary action.

Referring now to FIG. 6, fluid 80 reaches capillary break 52 and stops. At this point, fluid 80 forms a meniscus 82.

Figure 7:
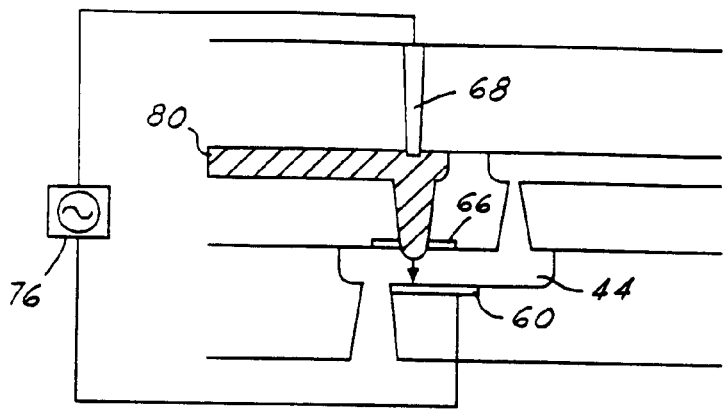
FIG. 7 is a cross-sectional view of a microfluidic device having a voltage applied between the first and third electrodes.

Referring now to FIG. 7, a voltage source is, applies a potential difference between first electrode 60 and second electrode 68 to draw fluid into sluice 44. The charge on the fluid draws the fluid toward the first electrode 60.

Figure 8:
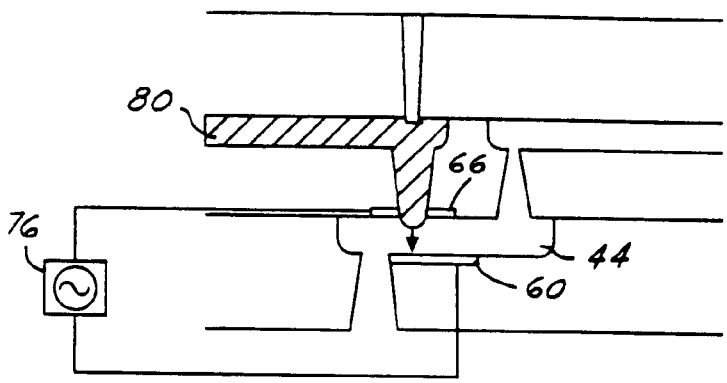
FIG. 8 is a cross-sectional view of a microfluidic device having a voltage applied between the first and second electrodes.

Referring now to FIG. 8, in this embodiment fluid 80 may also be drawn into sluice 44 using first electrode 60 and second electrode 66. Depending on the type of fluid, all of or a combination of electrodes 66 and 68 may be used.

Figure 9:
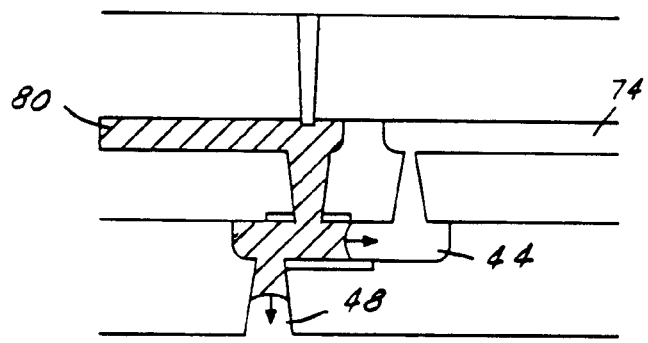
FIG. 9 is a cross-sectional view of a microfluidic device having the capillary break broken.

Referring now to FIG. 9, fluid is shown filling sluice 44 and output capillary channel 48 after the capillary break has been broken.

Figure 10:
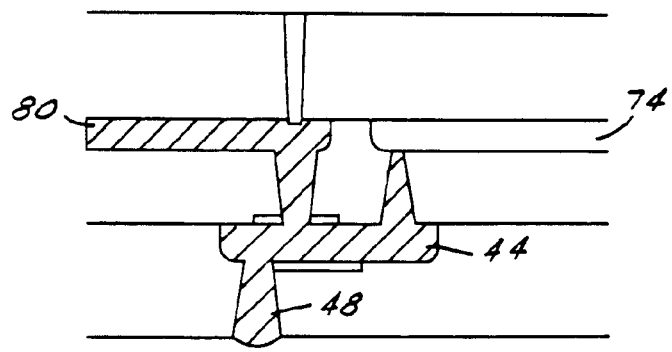
FIG. 10 is a cross-sectional view of a microfluidic device having the capillary break broken and the sluice filled.

Referring now to FIG. 10, the fluid 80 has filled sluice 44 and output capillary channel 48. When the capillary break has been broken, fluid continues to flow through output capillary channel 48. This may, for example, be used to fill a well chip with wells positioned adjacent to output capillary channel 48.

Figure 11:
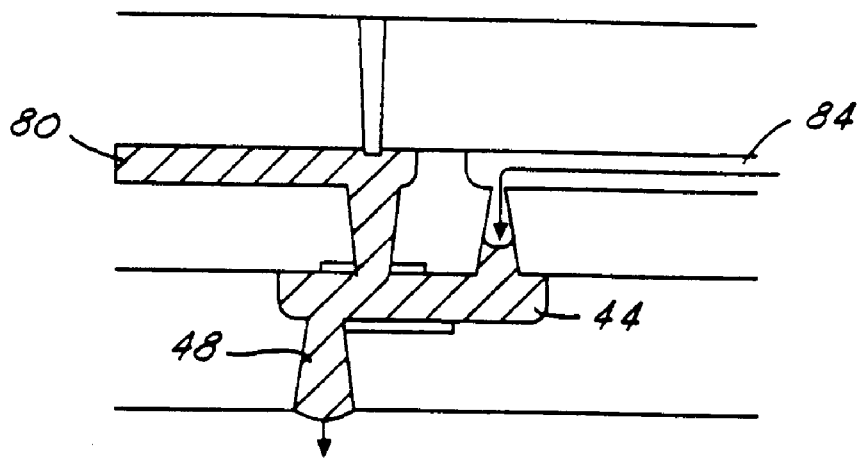
FIG. 11 is cross-sectional view of a microfluidic device having reset gas or air at the beginning of the flushing of the sluice.

Referring now to FIG. 11, to stop fluid from flowing from output capillary channel 48, air or gas is used to displace fluid in sluice 44 through reset channel 74. Fluid exits sluice through exit opening 64.

Figure 12:
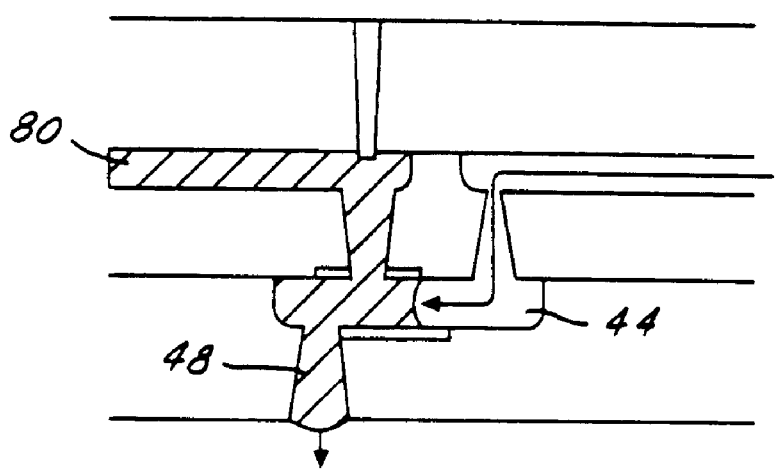
FIG. 12 is a cross-sectional view of a microfluidic device having the fluid expelled from the sluice.

Referring now to FIG. 12, the gas from reset channel 44 is shown flushing fluid out through output capillary channel 48. Once fluid is removed from sluice 44, fluid stops flowing through capillary break 52.

Figure 13:
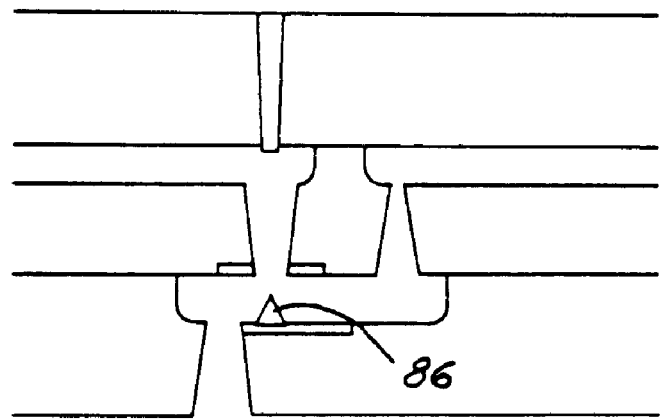
FIG. 13 is an alternative embodiment of a microfluidic device having a point electrode as the first electrode.

Referring now to FIG. 13, the first electrodes 60 may be replaced by a point electrode 66. The replacement of electrode 60 with a point electrode 86 depends upon the electrical characteristics of the fluid within the microfluidic device. By providing a point electrode 86 less distance between second electrode 62 is formed.

In operation, fluid from a fluid source is capillary and/or pressure pumped up to the capillary break 52. Voltage may then be applied to second electrode 62 and third electrode 68 to initiate the fluid flow into sluice 44. First electrode 60 and second electrode 62 may also be used to initiate the fluid flow. Once the capillary break has been broken, sluice 42 fills with fluid and fluid exits through the fluid opening 48. Fluid flow continues until sluice 44 is cleared of fluid. Fluid is cleared from sluice 44 through the use of a reset channel 74. Gas or air is pumped through reset channel 74 to clear liquid through opening 48.

Figure 14:
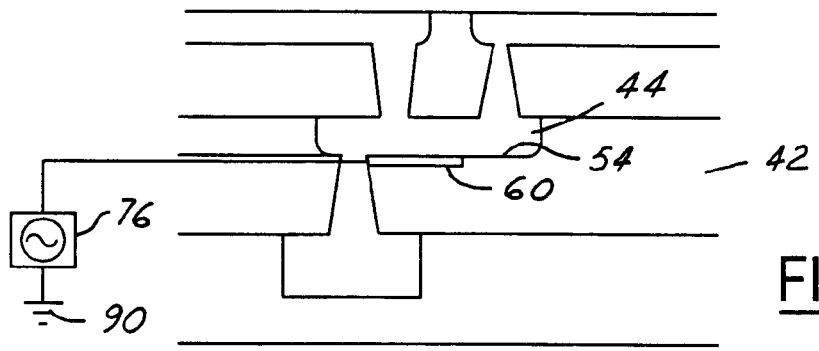
FIG. 14 is a cross-sectional view of one electrode embodiment according to the present invention.

Referring now to FIG. 14, the same reference numerals are used to identify identical components from the views above. Experimentally, it has been found that using a single electrode 60 may be used to move fluid. This described above electrode 60 is positioned on bottom surface 54 of sluice 44. Electrode 60 is coupled to the voltage source 76. The force from electrode 60 draws fluid into the sluice 44.

Figure 15:
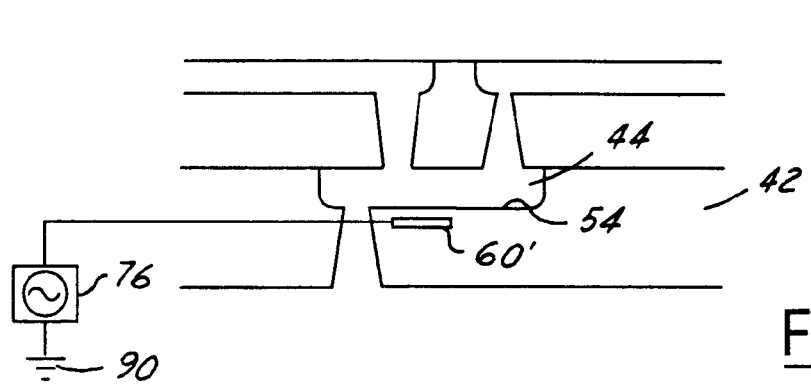
FIG. 15 is cross-sectional view of an alternative one electrode embodiment.

Referring now to FIG. 15, electrode 60' may be used alone. Electrode 60A is shown above in FIG. 4. Rather than being exposed directly to the fluid as in FIG. 4, electrode 60' is imbedded within layer 42. The operation of electrode 60' is similar to that of electrode 60.

Figure 16:
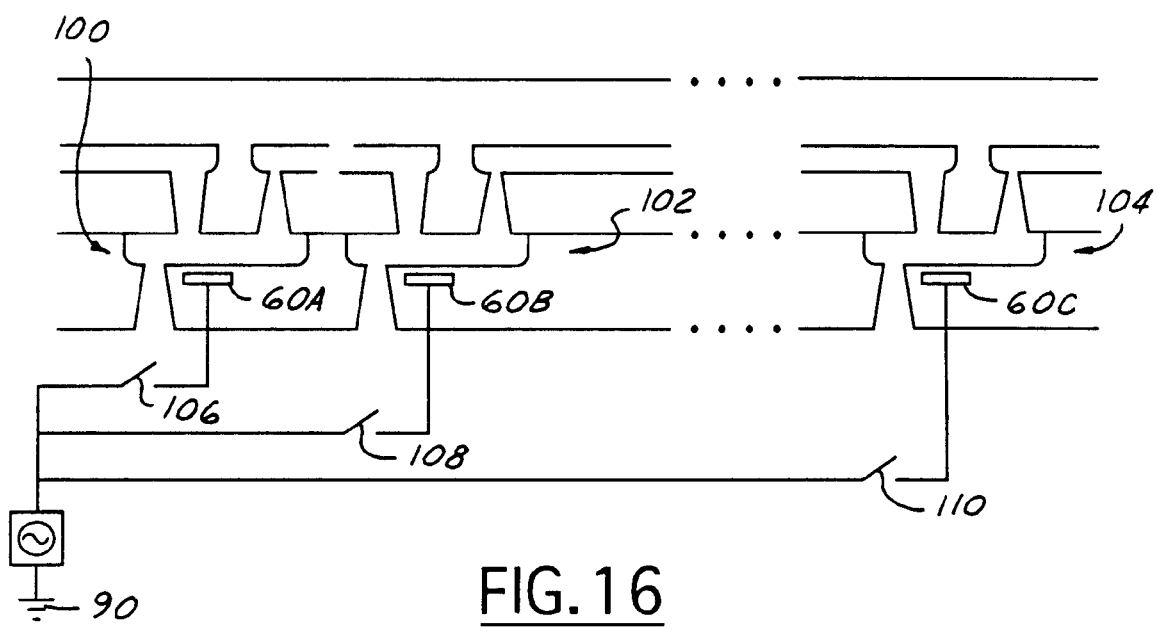
FIG. 16 is a cross-sectional view of an array using a number of one electrode embodiments with a common source.

Referring now to FIG. 16, a plurality of microfluidic devices 100, 102 and 104 may each use a single electrode 60A, 60 and 60C through a respective switch 106, 108 and 110. The operation of switches may be manually controlled or automatically controlled by a controller 76. Switches 106, 108 and 110 may be simultaneously or individually actuated depending on the desired operation of the system.

It is important to note that power source 76 in a single electrode system such as those shown in FIGS. 14 through 16, rather than having opposite polarities being coupled to two electrodes, the power source 76 is coupled to the one electrode and a ground 90.

A one electrode system such as those shown in FIGS. 14 through 16 generally work on the principle that an electric field is generated at the single electrode 60. The fluid is thus attracted to the electrode. This system is particularly suitable for aqueous solutions having a high dielectric constant.

While particular embodiments of the invention have been shown and described, numerous variations and alternate embodiments will occur to those skilled in the art. Accordingly, it is intended that the invention be limited only in terms of the appended claims.

What is claimed is:

1. A method of moving fluid within a microfluidic device comprising the steps of:

providing a microfluidic device having a capillary break;

providing a first electrode disposed at the bottom surface of a sluice separated from a capillary break;

providing a second electrode spaced a predetermined distance from said first electrode;

stopping the fluid at the capillary break;

filling the capillary up to capillary break with the fluid;

thereafter, applying a voltage between said first electrode and said second electrode;

generating an electric field at the first electrode sufficient to move fluid through the capilary break;

drawing the fluid through the capillary break in response to the electric field; and moving fluid into the sluice in response to the step of generating an electric field at the first electrode.

2. A method of moving fluid within a microfluidic device comprising the steps of:

providing a microfluidic device having a capillary break;

filling a fluid up to a capillary break;

providing a first electrode disposed at a bottom surface of a sluice separated from the capillary break and upper surface of the sluice;

providing a second electrode spaced apart from the first electrode within the capillary break;

providing a third electrode spaced apart from the first electrode within said input capillary channel;

filling the microfluidic device a fluied up to the capillary break;

thereafter, applying a voltage potential between said third electrode and the second to move fluid into the sluice from the capillary break; and thereafter applying a voltage potential between said first and second electrodes.

* * * * *

UNITED STATES PATENT AND TRADEMARK OFFICE
CERTIFICATE OF CORRECTION

PATENT NO.    : 6,444,106 B1
DATED         : September 3, 2002
INVENTOR(S)   : Sterling Eduard McBride, Satyam Choudary Cherukuri and Pamela Kay York It is certified that error appears in the above-identified patent and that said Letters Patent is hereby corrected as shown below:

<u>Column 6,</u>
Line 51, should read:
-- filling the microfluidic device with a fluid up to the capillary break; --

Signed and Sealed this

Twenty-eighth Day of January, 2003

JAMES E. ROGAN
*Director of the United States Patent and Trademark Office*